… … …

United States Patent Office 3,436,405
Patented Apr. 1, 1969

3,436,405
PROCESS FOR THE PREPARATION OF GIBBERELLIN ESTERS
Robert A. Gasser, McGaheysville, and Pascal W. Cooper, Harrisonburg, Va., assignors to Merck & Co., Inc., Rahway, N.J., a corporation of New Jersey
No Drawing. Continuation of application Ser. No. 391,034, Aug. 20, 1964. This application Feb. 20, 1967, Ser. No. 617,424
Int. Cl. C07d 5/32; A01n 21/02
U.S. Cl. 260—343.3         6 Claims

ABSTRACT OF THE DISCLOSURE

Process for the preparation of a gibberellin ester from the corresponding acid via reaction with an esterifying halide in the presence of a tertiary amine.

---

This application is a continuation of application Ser. No. 391,034, filed Aug. 20, 1964, and now abandoned.

This invention relates to new and improved methods for preparing esters, including alkoxy loweralkyl esters, of the carboxyl containing gibberellins by reaction with a tri-loweralkyamine and high purity esterifying halide. More particularly, the invention relates to new and improved methods for preparing high purity alkoxy loweralkyl bromides, and the utilization thereof in producing alkoxy loweralkyl gibberellates in high yield and high purity.

Gibberellic acid, also sometimes referred to as gibberellin X, or gibberellin $A_3$, is one, and generally considered the most active, of a group of substances derived from cultures of the fungus *Gibberella fujikuroi* which are collectively referred to as the gibberellins, and which have advantageous uses as plant growth regulators. Gibberellic acid has the empirical formula $C_{19}H_{22}O_6$, and the structural formula:

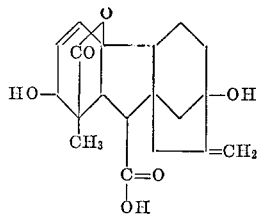

Other gibberellins which are active plant growth stimulants closely resembling gibberellic acid in structure, and which contain the characteristic carboxyl grouping include gibberellin $A_1$ ($C_{19}H_{24}O_6$), gibberellin $A_2$ ($C_{19}H_{26}O_6$), and gibberellin $A_4$ ($C_{18}H_{22}O_5$). These and other gibberellins containing a carboxylic acid grouping are suitable for use in the process of this invention.

In preparing esters in accordance with the present invention, the group

must be converted to

wherein R is alkyl, aralkyl, or alkoxy lower-alkyl without disturbing other substituents of the molecule, and particularly without disturbing the lactone function in ring A. Methods heretofore available for preparing esters of the gibberellins have left much to be desired from the standpoint of commercial practicability due to poor yields, and excessive by-product formation, including anhydride formation, and shift or destruction of the lactone function in ring A. At the same time, there is a distinct need for a commercially practical method for producing esters of the gibberellins, since it is known that the esters have a greater capacity to penetrate and distribute within plant tissues, and particularly older plant tissues, to exert the characteristic growth stimulating effect than do the free acids or the common salts, such as the monobasic sodium, potassium, or ammonium salts.

The process in accordance with the present invention satisfies this need in providing for the production of esters of the gibberellins in high yield and purity, and in accordance with certain preferred embodiments, makes possible for the first time, the practical production of alkoxy loweralkyl esters of the gibberellins. A preferred ester in this regard is the 2-butoxyethyl ester of gibberellic acid (also sometimes referred to as n-butyl Cellosolve gibberellate).

Regarded in certain of its broader aspects, the process in accordance with the present invention comprises reacting a gibberellin with a tri-loweralkylamine to form the tri-alkylamine salt of the gibberellin, and reacting the tri-alkylamine salt with the desired esterifying halide of the formula RX, where R is selected from the group consisting of $C_1$ to $C_9$ alkyl, alkoxy loweralkyl, and benzyl radicals and X is a halogen of the group consisting of iodine, bromine and chlorine, and recovering the gibberellin ester from the reaction mixture.

The tri-loweralkylamine employed in the initial salt formation can be trimethylamine, triethylamine, or tripropylamine. In the subsequent reaction of the amine salt with esterifying halide, higher yields are generally obtained if the esterifying halide is a bromide; and even in the case of the bromides, they should be of high purity, since impurities sometimes associated therewith can adversely affect the esterification yield.

Esterification with alkoxy loweralkyl bromide is particularly sensitive to the presence of impurities, and it is preferable to prepare such bromides by reacting the appropriate alkoxy lower alkanol with phosphorous tribromide in the presence of a tertiary amine, suitably a cyclic tertiary amine, such as pyridine, the picolines, and the lutidines. In this reaction, a moderate excess of the alkoxy lower alkanol is employed (about a 5 to 15% excess), and the tertiary amine and phosphorous tribromide are preferably in approximately equimolecular proportions. This proportion of tertiary amine is critical, since too much tertiary amine leads to losses in the water washes during workup and recovery of product, and too little tertiary amine leads to excessive by-product formation (primarily alkyl bromide and lower alkylene dibromide) due to HBr clevage of the alkoxy lower alkanol. The reaction with phosphorous tribromide is a multistage reaction with HBr being a necessary intermediate by-product, and the tertiary amine appears to sufficiently bind the liberated HBr to limit its cleavage of the alkoxy lower alkanol while still permitting good yields in the overall bromination reaction.

The bromination reaction is carried out at atmospheric pressure under anhydrous conditions by first mixing together the pyridine or other tertiary amine and alkoxy lower alkanol, and then slowly adding the phosphorous tribromide with stirring. During this addition, the temperature will reach a maximum (about 130° C. in the case of 2-butoxy ethanol in the presence of pyridine) which is maintained for about 1 to 3 hours, and the reaction mixture is then cooled to about room temperature, or slightly below, for workup. The mixture is washed free of acids and tertiary amine hydrobromide by washes of water, aqueous inorganic base, and water. The residue is then subjected to further purification as by distilling or solvent extraction. A particularly effective way to effect this further purification is vacuum topping at about 20 mm. pressure until the temperature at the top of the column has reached a predetermined level (65 to 67° C. in the case of 2-butoxyethyl bromide); indicating that the lower boiling impurities have been substantially removed, leaving in the still essentially pure alkoxy loweralkyl bromide. This procedure for obtaining high purity bromide applies generally to the preparation of alkoxy alkyl bromides in which the number of carbon atoms in the alkoxy and alkyl ethoxypropyl, methoxybutyl, methoxyethyl, butoxyethyl, and butoxybutyl bromides.

The esterification of gibberellins in accordance with the present invention can be carried out in two stages by first reacting the gibberellin in alcohol solution, with a tri-loweralkylamine to form the tri-loweralkylamine salt, and then reacting the salt with the desired esterifying halide. Enhanced yields can be obtained however, with substantial economies in the overall process, by a one-stage reaction in which the reactants are dissolved in a loweralkyl ketone, such as acetone, methylethyl ketone, methylisobutyl ketone, and methyl-n-propyl ketone, which is also solvent for the ester being formed, so that the salt is formed in situ and reacts directly with the esterifying halide. In the latter instance, ester recovery is effected by adding water to the reaction mixture, removing the solvent in vacuo to leave an aqueous slurry of crude ester, filtering off the aqueous phase, and washing free of H+, suitably with an aqueous inorganic base. While quite pure at this stage, the crystalline ester thus obtained can be further purified by recrystallizing from suitable solvent or solvent mixtures. Typical solvents for this purpose include toluene, ethyl acetate, and chloroform plus petroleum ether, but it will be apparent that many other solvents, or solvent mixtures can be employed for recrystallization.

The following examples show how procedures of the present invention can be employed in preparing various esters of gibberellic acid, but it is to be understood that these examples are given by way of illustration and not of limitation:

EXAMPLE I

Gibberellic acid, 3.46 g., was dissolved in 30 ml. of methanol and then 20 ml. of triethylamine was added to form the triethylamine salt, and the methanol was removed in vacuo. Methyl iodide, 3.3 gm. was added to the residual triethylamine salt and the mixture was allowed to stand at room temperature for 65 hours. The reaction mixture was then distributed between ethyl acetate and water, and after washing with saturated sodium bicarbonate solution, the organic layer was concentrated to dryness. The residue was taken up in chloroform and petroleum ether was added, causing crystalline methyl gibberellate to separate. The methyl ester, having a melting point of 198–204° C. was recovered in about 28% yield.

EXAMPLE II

The triethylamine salt of gibberellic acid was prepared as in Example I. Then 1.31 g. of ethyl bromide was added and the mixture was heated to 100° C. for seven hours. After cooling to 25° C., the reaction mixture was distributed between ethyl acetate and water, and after several water washes, the organic layer was dried and concentrated to give crystals of ethyl gibberrellate, M.P. 152–155° C., in 40% yield.

EXAMPLE III

The triethylamine salt of gibberellic acid was prepared as in Example I, using 17.3 g. of gibberellic acid, 50 ml. of methanol, and 5.05 g. of triethylamine. After removing the methanol, the residue was heated with 10.29 g. of n-butyl bromide for seven hours at 100° C. The reaction mixture was then cooled to 25° C. and distributed between ethyl acetate and water. The organic layer was washed several times with water, dried, and concentrated to give crystals of n-butyl gibberellate, M.P. 155–156.5° C. in 70.5% yield.

EXAMPLE IV

Bromination of n-butyl Cellosolve (2-butoxy-ethanol).

Phosphorous tribromide (181 g.) was added to a mixture of 2-butoxy-ethanol (262 g.) and pyridine (52.7 g.) allowing the temperature to rise to 130° C. After ageing for two hours at 130° C., the mixture was washed with water and saturated sodium bicarbonate solution to remove acids and pyridine hydrobromide. Purification of the organic layer was effected by removing volatile by-products in vacuo until a constant boiling point of 65–67° C./20 mm. was reached. The residue remaining after this vacuum "topping" was essentially pure 2-butoxyethylbromide as determined by vapor phase chromatography, and represented a 65% yield.

A quantity of this 2-butoxyethylbromide was used to prepare n-butyl Cellosolve gibberellate (2-butoxyethyl gibberellate) according to the following procedure:

A solution of gibberellic acid (17.3 g.), triethylamine (8.84 g.), and 2-butoxyethylbromide (15.54 g.) in methyl ethyl ketone (50 ml.) was refluxed for 18 hours. Water (75 ml.) was added and the methyl ethyl ketone was removed in vacuo to leave a crystalline slurry of crude 2-butoxyethyl gibberellate. After filtering, washing with water and drying 20.4 g. of crystallin product was recovered representing a 92% yield.

The crude ester was recrystallized from 300 ml. of hot toluene in one crop to give essentially pure 2-butoxyethyl gibberellate, 18.8 g. representing an 84.4% yield. M.P. 171.5–172° C.

*Partial analysis.*—Found, percent: C=67.32, H=7.77. Calc'd., percent: C=67.24, H=7.67.

In another similar run, the crude ester was slurried with vigorous stirring for 30 minutes with 60 ml. of a 4:1 hexane-ethyl acetate mixture. After filtration and washing with 20 ml. of the same mixture, the purified ester was air dried to constant weight giving 19.33 g. of product, 86.7% yield, melting at 169–170.5° C. This ester showed a single spot on thin layer chromatography and was judged to be 95 to 98% pure.

The procedure of the foregoing example can be followed in preparing other alkoxy lower alkyl bromides and esters by replacing the 262 g. of 2-butoxy ethanol in the bromination step with a molar equivalent of another alcohol, such as ethoxyethanol, ethoxypropanol, methoxybutanol, methoxyethanol, or butoxybutanol, and using in the esterification step an amount of alkoxy lower alkyl bromide which is the molar equivalent of the 15.54 g. of butoxyethylbromide. The 8.84 g. of triethylamine can also be replaced by a molor equivalent of another tri-loweralkylamine. With these changes, the methyl ethyl ketone will remain a satisfactory solvent in which to conduct the esterification, although with particular combinations of amine and bromide reactants, it is possible that another loweralkyl ketone, or mixture of ketones, may provide optimum solubility and boiling point properties.

EXAMPLE V

Gibberellic acid (3.46 g.) was disolved in 30 ml. of methanol, then 20 ml. of triethylamine was added. The methanol was then removed in vacuo. The residue was heated with 3.0 g. of n-octyl iodide for four hours at 100° C. Upon cooling to 25° C. the mixture was distributed between ethylacetate and water, and after several water washes the organic layer was dried and concentrated to give crystals of the n-octyl gibberellate ester in 31% yield. After one recrystallization from ethyl acetate this product melted at 160–161° C. Found, percent: C=70.64, H=8.55. Calc'd. percent: C=70.72, H=8.35.

Gibberellic acid (17.3 g.) was dissolved in methyl ethyl ketone (50 ml.) by adding triethylamine (8.84 g.).

Then 11.05 g. of benzyl chloride was added and the mixture was refluxed for four hours. Water (100 ml.) was added and the methyl ethyl ketone was removed in vacuo. The slurry was filtered and washed with saturated sodium bicarbonate solution. After drying benzyl gibberellate was obtanied in 94% yield, M.P. 169.5–172° C. A specially purified sample melted at 173–174.5° C.

In the ketone refluxing technique, it is preferable to employ approximately 1.5 mols each of amine and halide per mol of gibberellin. An increase in this ratio to 2.0 mols per mol of acid, gives somewhat higher yields at the expense of lower purity; whereas if the proportion is below 1.5 mols per mol of acid, the yield of ester is markedly lower, although quality does not appear to be affected.

The preparation of gibberellin esters by the herein disclosed procedure of forming the amine salt and reacting with the esterifying halide, preferably in the single solvent (ketone refluxing) system, appears to minimize the formation of undesired by-products due to changes, such as lactone shift or anhydride formation. Furthermore when the esterifying halide is an alkoxy-lower alkyl bromide, the herein disclosed procedure for preparing the bromide assures the necessary freedom from undesired bromide impurities which permits the direct recovery of the desired alkoxy loweralkyl ester in high yield and purity.

Various changes and modifications in the procedures herein disclosed will occur to those skilled in the art, and to the extent that such changes and modifications are embraced by the appended claims, it is to be understood that they constitute part of the present invention.

What is claimed is:

1. The process for the preparation of a gibberellin ester which comprises refluxing in a loweralkyl ketone a gibberellin carboxylic acid together with an excess of each of a tertiary loweralkyl amine and an esterifying halide of the formula

RX where R is selected from the group consisting of $C_1$ to $C_9$ alkyl, alkoxy loweralkyl, and benzyl radicals, and X is a halogen selected from the group consisting of iodine, bromine, and chlorine.

2. The process as defined in claim 1 wherein the tertiary loweralkyl amine and the esterifying halide are reacted in the ratio of about 1.5 moles of each per mole of the gibberellin carboxylic acid.

3. The process as defined in claim 2 wherein the loweralkyl ketone is methylethyl ketone, and the tertiary loweralkyl amine is triethylamine.

4. The process of claim 1 wherein the gibberellin carboxylic acid is gibberellic acid and the esterifying halide is an alkoxy loweralkyl halide.

5. The process as defined in claim 4 wherein the tertiary loweralkyl amine and the alkoxy loweralkyl halide are reacted in the ratio of about 1.5 moles of each per mole of the gibberellic acid.

6. The process of claim 4 wherein the alkoxy loweralkyl halide is 2-butoxyethyl bromide.

References Cited

UNITED STATES PATENTS

| | | | |
|---|---|---|---|
| 3,148,200 | 9/1964 | Mills et al. | 260—410.6 |
| 3,038,794 | 6/1962 | Geary et al. | 71—2.5 |

ALEX MAZEL, *Primary Examiner.*

J. A. NARCAVAGE, *Assistant Examiner.*

U.S. Cl. X.R.

71—77